July 2, 1940.   R. V. SHANKLAND   2,206,055
GAS REVERSION
Filed Jan. 6, 1938
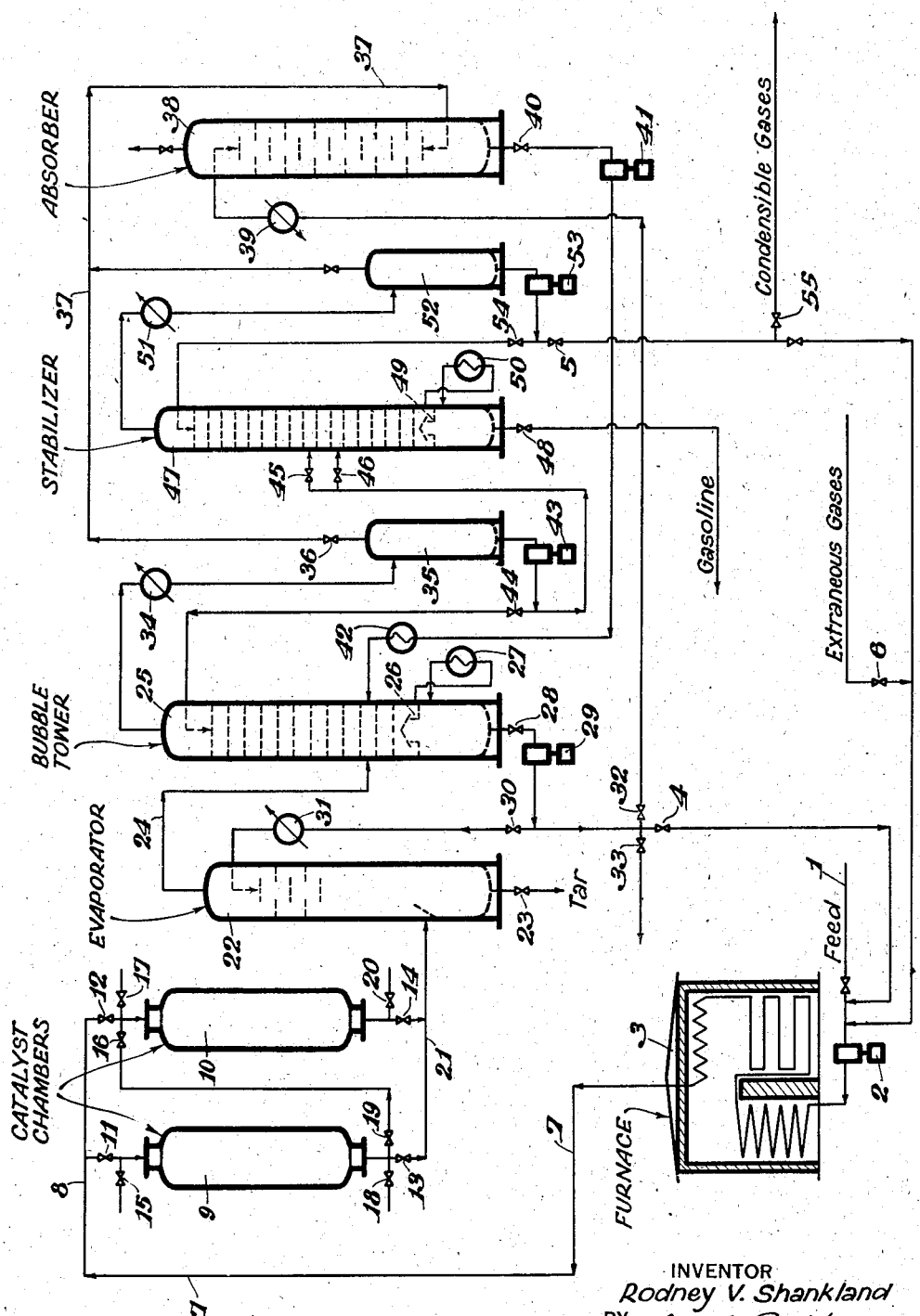
INVENTOR
Rodney V. Shankland
BY Geo. L. Parkhurst
ATTORNEY Patented July 2, 1940

2,206,055

UNITED STATES PATENT OFFICE 2,206,055

GAS REVERSION

Rodney V. Shankland, Chicago, Ill., assignor to Standard Oil Company, Chicago, Ill., a corporation of Indiana Application January 6, 1938, Serial No. 183,567

8 Claims. (Cl. 196—9)

This invention relates to catalytic gas reversion processes. It also relates to gas reversion catalysts.

One object of my invention is to provide new and improved methods of manufacturing gasoline. More specifically, an object of my invention is to provide new and improved methods of gas reversion. Another object is to provide improved catalysts for this purpose. Further and more detailed objects, uses and advantages of my invention will become apparent as the description thereof proceeds.

In the manufacture of gasoline by means of gas reversion, a normally liquid charging stock boiling in the upper part of the gasoline range and/or above the gasoline range is contacted at an elevated temperature with one or more normally-gaseous hydrocarbons. Hydrocarbon gases rich in three carbon atom hydrocarbons are usually used. Under appropriate conditions the normally-liquid charging stock is cracked and the hydrocarbon gases may also crack to some extent. Polymerization reactions likewise occur and furthermore the hydrocarbon gases and/or their degradation products react with and alkylate the normally-liquid hydrocarbon components and/or their degradation products. The overall result is a process which makes efficient use of both light and heavy hydrocarbons to produce unusually good yields of gasoline having unusually good antiknock qualities.

My invention relates in large measure to certain new gas reversion catalysts and to their use in gas reversion processes to improve yields and quality of product. These catalysts can be generically defined as boron silicate catalysts.

However, my catalysts need not be the pure chemical compound known as boron silicate but can be any material of the general composition $aB_2O_3.bSiO_2$ or $aB_2O_3.bSiO_2.cH_2O$. The oxides of boron and silicon can be combined in any desired proportions to form solid solutions or loose chemical associations which are not bound by the rigid laws of stoichiometry. However, it is important that the $B_2O_3$ and $SiO_2$ be intimately associated with each other and not merely mechanically admixed. I can therefore refer to my compositions as comprising boron oxide and silicon oxide in intimate molecular association.

In the general formula $aB_2O_3.bSiO_2$, $a$ is suitably less than $b$ and can be from about 0.1% to about 40% of $a+b$. In other words, the composition can contain from 0.1 to 40 mol percent $B_2O_3$. In addition water can, and preferably should, be present as indicated by the formula $aB_2O_3.bSiO_2.cH_2O$ and $c$ can range from zero to numbers of the same general order of magnitude as $a+b$. Thus my preferred catalysts contain what can be referred to as hydrated boron silicate.

While $a$ can range from about 0.1% to about 40% of $a+b$, it is preferable that it range from about 0.5% to about 10%, or in other words that there be from about 0.5 to about 10 mol percent of boron oxide in my "boron silicate." These ranges are stated on an anhydrous basis.

My catalysts can be prepared in various ways but I find it highly desirable to prepare them by making a silica gel, washing it free from contamination, suspending it in a solution of boric acid, and then drying the resulting boron silicate product. By this procedure $B_2O_3$ can be adsorbed on and combined with the $SiO_2$.

As an example of the method of preparing a catalyst of this type, the silica present in 640 parts by volume of 34° Baumé water glass can be diluted with 500 parts by volume of pure water and precipitated with 100 parts by volume of concentrated hydrochloric acid. The gel should then be filtered and washed thoroughly with pure water. This gel can then be digested for several hours at about 200° F. with 2000 parts by volume of a 10% boric acid solution. Excess boric acid can be removed by repeated washing with pure water, and the residue dried at room temperature, yielding a product containing a little less than five mol percent $B_2O_3$ on a dry basis. This catalyst can be considered to be boron silicate supported on hydrated silica.

A catalyst of this type should be heated to approximately the temperature at which it is to be used before incorporating it in the catalyst chamber since otherwise it tends to shrink in volume when subjected to reaction conditions.

By manufacturing "boron silicate" with the aid of boric acid no impurities are introduced and in this respect these catalysts have a pronounced advantage over aluminum silicate prepared from an aluminum salt and silica gel. In the latter case some residual radical, such as $SO_4$ is left in the molecule. It is thus highly desirable to use boric acid in making "boron silicate" catalyst but it is to be understood that other sources of borate ions can be substituted, for instance a solution of sodium tetraborate (borax) can be substituted for the boric acid in the manufacture of this catalyst.

While this boron silicate catalyst can be used as such in gas reversion processes, it can be used to advantage deposited on a catalyst support.

This is particularly true since the catalyst has a rather fragile structure and is therefore difficult to handle.

Inert supports can be used but I prefer to use a support which has some catalytic activity and various clays are therefore suitable. Kieselguhr, diatomaceous earth, Attapulgus clay, etc. can be used. It is desirable, however, to use an inexpensive material such as spent clay from operations such as the treating, sweetening and decolorization of mineral oils. Acid treated clays or acid treated earths can also be used.

Such a supported boron silicate catalyst can be made as follows:

A thoroughly agitated suspension of a finely-divided clay, such as "Attapulgus fines" in hot water, is treated first with a solution of sodium silicate, then with a solution of an acid such as hydrochloric. The acid can be added before the sodium silicate, but must be more than sufficient to neutralize the solution. The total amount of silica gel produced should not exceed 10% by weight of the clay present. The suspension is then washed free of sodium chloride. To the washed suspension of clay-supported silica gel is now added a solution of boric acid, the mixture is warmed for an hour or more, again washed thoroughly, and filtered. The resulting cake is molded as desired, dried, and employed as a cracking catalyst. It will be observed that the highly-catalytic material (boron silicate) is supported upon clay which is itself active.

While I prefer to prepare these "boron silicate" catalysts by the use of boric acid and silica gel as above described it will be apparent that "boron silicate" can be prepared in other ways. For instance, it can be made by reacting halides of boron and silica with steam or water. Boron trifluoride and silicon tetrachloride are suitable but boron trichloride, and silicon oxychloride or silicon tetrafluoride can be used. The halide vapors can be generated separately and mixed in correct proportions and then precipitated with steam. They can, on the other hand, be conducted separately to the catalyst bed and adsorbed thereon. Steam can then be introduced to hydrolyze these halides. Water required for hydrolysis can be applied to the catalyst bed before applying the halide vapors. This method of preparing boron silicate catalysts has the advantage that the catalyst bed can be regenerated by depositing a fresh surface of boron silicate thereon.

As previously outlined my boron silicate catalysts are generally compositions such as $$aB_2O_3.bSiO_2.cH_2O$$

However, other metallic oxides can be present along with the $B_2O_3$. One suitable additional metallic-oxide is alumina, $Al_2O_3$.

Thus materials of the composition $$aB_2O_3.bAl_2O_3.cSiO_2$$

or preferably $aB_2O_3.bAl_2O_3.cSiO_2.dH_2O$ can be used in gas reversion processes in accordance with my invention.

In the general formula $aB_2O_3.bAl_2O_3.cSiO_2$, $a+b$ can be from about 0.1% to about 40% of $a+b+c$ and preferably from about 0.5% to about 15% of $a+b+c$. In other words, the composition can contain from about 0.1 to about 40 mol percent of $B_2O_3$ and $Al_2O_3$, and preferably from about 0.5 to about 15 mol percent of $B_2O_3$ and $Al_2O_3$ on an anhydrous basis. In addition, water of hydration can be and preferably should be present as indicated by the formula $$aB_2O_3.bAl_2O_3.cSiO_2.dH_2O$$

and $d$ can range up to the numbers of the same general order of magnitude as $a+b+c$. Minor proportions of other substances can be present but I prefer that the catalyst be substantially free from other substances. However, catalyst supports can be used.

The ratio of $a$ to $b$ in the foregoing formulae can be varied widely. It can for instance range from about 1:100 to about 50:1, but preferably from about 1:10 to about 5:1.

One very desirable way of preparing a catalyst of this type is to precipitate silica gel by adding hydrochloric acid to a solution of water glass (sodium silicate). This gel can then be filtered and washed with distilled water. Solutions of a boron compound and an aluminum compound can then be added. Very substantial quantities of these compounds will be adsorbed on the silica gel. It is advantageous to digest the wet silica gel in the presence of a solution containing a boron compound and an aluminum compound for a considerable period of time, for instance several hours. The unadsorbed material can then be removed by repeated washing with water and the residue dried. The catalyst should be heated to approximately the temperature at which it is to be used before incorporating it in the catalyst chamber since otherwise it tends to shrink in volume when subjected to reaction conditions. The product thus made can be referred to as boro aluminum silicate supported on hydrated silica. It also comes within the broad class of "Boron silicate catalysts."

The preferred boron compound used in making my catalyst by the above described method is boric acid since when the product is dried no residual radical is left in the final product other than that necessarily introduced along with the aluminum. However, other boron compounds, for instance borax (sodium tetraborate) can be used in place of the boric acid. The aluminum compound chosen can be an aluminum salt in which the aluminum is either in the anion or in the cation, for instance sodium aluminate or aluminum sulfate can be used.

Since only a small proportion of the total boron and aluminum compounds is adsorbed on the silica gel it is necessary to use a very considerable excess.

It will be apparent that this procedure for making a boro aluminum silicate catalyst can be varied considerably. Thus, for instance, a solution of boric acid and aluminum sulfate can be added to a solution of water glass and the silica gel can be precipitated by the use of hydrochloric acid in the presence of the boron and aluminum compounds.

Furthermore, these boro aluminum silicate catalysts can be prepared by various dry methods as will be apparent to those skilled in the art.

Another manner in which boro aluminum silicates can be prepared and one which permits their preparation entirely uncontaminated with radicals other than $B_2O_3$, $Al_2O_3$ and $SiO_2$ is by reacting volatile halides of boron, aluminum and silicon with steam or water. Boron trifluoride, aluminum trichloride and silicon tetrachloride are suitable but other volatile halides including boron trichloride, aluminum tribromide, silicon oxychloride and silicon tetrafluoride can be used. The halide vapors can be generated separately and mixed in correct proportions and then precipitated with steam. They can, on the other hand, be conducted separately to the catalyst bed id adsorbed thereon. Steam can then be introduced to hydrolyze these halides. Water required for hydrolysis can be applied to the catalyst bed before applying the halide vapors. This method of preparing boro aluminum silicate catalyst has the advantage that the catalyst bed can be regenerated by depositing a fresh surface of boro aluminum silicate thereon.

While boro aluminum silicate catalysts can be used as such they also can be used to advantage deposited on a catalyst support in addition hydrated silica. The catalyst support can be incorporated with a suspension of silica gel at the time of the adsorption of the boron compound and aluminum compound on the silica gel. The resulting cake after washing can be molded as desired, dried and employed as a cracking catalyst.

Instead of starting with separate compounds of boron, aluminum and silicon in the manufacture of this type of catalyst, it is possible to start with a natural clay, for instance Fuller's earth or Attapulgus clay. Diatomaceous earth can also be used. One of these materials can be treated with acid, for instance by repeated washing with a dilute solution of hydrochloric or sulfuric acid, which not only has the advantage of removing impurities such as compounds of sodium, potassium and calcium but also, which is more important, serves to reduce the aluminum content of the clay. After washing the clay with acid, it can suitably be washed with water and then digested with a solution of boric acid or other boron compound. The boron compound is adsorbed to a considerable extent on the surface of the clay. Washing and drying then produces boro aluminum silicate product. Both this method of producing the boro aluminum silicate and the other methods described above have the advantage, as compared with the use of natural compounds which may contain boron and aluminum silicates, that the composition is controllable and a product results which is free or relatively free from undesired radicals, particularly from potassium, sodium and calcium which are in some instances deleterious and which at best serve to dilute the catalyst.

While I prefer to adsorb a boron compound on acid treated clay, boro aluminum silicate catalysts can also be prepared by adsorbing boric acid on a clay or diatomaceous earth which has not been acid treated.

The use of these various boron silicate catalysts in gas reversion processes will now be described with particular reference to the accompanying drawing which is a flow diagram illustrating one specific embodiment of my invention.

A charging stock which is preferably a gas oil, virgin heavy naphtha or other hydrocarbon material boiling at least predominantly between about 200° F. and about 750° F. is introduced through line 1 by means of pump 2 into the coils of furnace 3. Liquid cycle stock is also preferably introduced through valve 4. With these liquid charging stocks is introduced likewise a charging stock consisting of hydrocarbon gases. I find it desirable to use the gases produced as will hereinafter be described which are recycled to furnace 3 through valve 5. Extraneous gas rich in one or more hydrocarbons having two, three or four carbon atoms per molecule, preferably one rich in propene and/or butenes, can be introduced through valved line 6.

From about 5% to about 50% of the weight of the charge to the gas reversion operation can be made up of normally-gaseous components.

The heated materials from furnace 3 pass through transfer line 7 to header 8 and hence through one or more of a set of catalyst chambers. Two catalyst chambers 9 and 10 are shown but it will be understood that any desired number can be used and that a larger number is preferable.

Catalyst chambers 9 and 10, which can be of any known type, are filled or partially filled with one of the previously described catalysts comprising boron silicate, preferably hydrated boron silicate.

These catalyst chambers are preferably designed with piping and valve connections so that they can be used either in series or in parallel and so that any one or more of them can be cut out of the system for regeneration while the remaining chambers remain on stream. Thus, for instance, by opening valves 11 to 14 and closing valves 15 to 20 the two catalyst chambers shown can be used in parallel while by opening valves 11, 19, 16 and 14 and closing the remainder of valves 11 to 20, the two chambers can be used in series.

When the catalyst in any one reaction chamber becomes spent it can be revivified by controlled blowing with an oxygen-containing gas at an elevated temperature to remove the carbon deposited on the catalyst. Thus, in the case of reaction chamber 9 this can be accomplished while reaction chamber 10 is on stream by closing valves 11, 13, 19, 16, 17 and 20, while leaving valves 15, 18, 12 and 14 open. Oxygen-containing gas, for instance a mixture of flue gas with a minor proportion of air, can then be introduced through valve 15 and removed through valve 18 or vice versa. The temperature during the revivification operation can suitably be about 1000° F.

Control of the revivification operation can be accomplished by temperature control, control of the rate of passage of revivification gas, control of the dilution of this revivification gas or any combination of these control methods, in order to avoid local overheating and consequent injury to the catalyst.

Steam can also be used for revivification purposes and/or with the charge.

The conditions which should prevail in the gas reversion catalyst chambers depend on the nature of the charging stock, the desired extent of reaction, the particular boron silicate catalyst chosen, and other factors familiar to those skilled in the art but may suitably include temperatures from about 800° F. to about 1100° F. and pressures from about atmospheric to several thousand pounds per square inch, but preferably from about 100 pounds per square inch to about 1000 pounds per square inch. The optimum contact time varies greatly with various factors, particularly temperature and nature of charging stock, but contact times within the range from about 5 seconds to about 15 minutes can in general be used. For instance my catalysts can be used in gas reversion processes involving virgin 35° A. P. I. Mid-Continent gas oil at a temperature of about 925° F., a pressure of about 500 pounds per square inch and a contact time of about 30 seconds for a once-through operation. If, however, the gas oil produced on the unit is recycled through valve 4 the contact time should be increased and might suitably be 100 seconds. From the reaction chambers the products of the catalytic gas reversion operation pass through header 21 to evaporator 22. The material entering evaporator 22 is separated into a tar fraction which is removed through valved line 23 and a gas oil and lighter fraction which passes overhead through line 24 into bubble tower 25.

In bubble tower 25 the material from evaporator 22 consisting of all substances lighter than tar is fractionated to separate a gas oil bottoms from an overhead fraction which includes gasoline range hydrocarbons and gases. Control is accomplished by the reflux at the top of the tower and a reboiler near its base comprising trap-out plate 26 and heater 27. The gas oil is removed from the base of the tower 25 and passes through valve 28 and pump 29 and thence to various possible destinations. A portion of this gas oil can be returned to evaporator 22 through valve 30 and cooler 31 as quenching and reflux medium. Another portion can be, and preferably is, recycled to furnace 3 through valve 4. Still another portion can be sent through valve 32 for use as absorber oil as will hereinafter appear. Any excess of gas oil can be removed from the system through valve 33.

The overhead from bubble tower 25 passes through condenser 34 to reflux drum 35. The condenser is so operated as to condense as much as possible of the three carbon atom and heavier hydrocarbons as well as some substantial amount of two carbon atom hydrocarbons, if desired. The lighter substances, notably hydrogen, methane and two carbon atom hydrocarbons carrying some heavier hydrocarbons with them pass overhead through valve 36 and line 37 to absorber 38 where they pass countercurrent to an absorber oil which can suitably be cycle gas oil introduced through valve 32 and cooler 39. Hydrocarbons heavier than ethane are absorbed in absorber 38 and pass back to bubble tower 25 through valve 40, pump 41 and heater 42.

Returning to reflux drum 35, the condensables, including gasoline, are removed by pump 43 and pass in part back to bubble tower 25 through valve 44 for use as reflux and in part through valve 45 and/or valve 46 into stabilizer 47 from the base of which stabilized gasoline is removed through valved line 48. Stabilizer 47 is equipped with the customary reboiler comprising trap-out plate 49 and heater 50.

Passing overhead from stabilizer 47, the gases pass through condenser 51 into reflux drum 52. The condensate may contain two carbon atom hydrocarbons but is mainly composed of three carbon atom hydrocarbons together with such portion of the four carbon atom hydrocarbons as cannot be utilized in the stabilized gasoline. This condensate is removed by pump 53 and passes in part through valve 54 back to stabilizer 47 as reflux and in part through valve 5 back to furnace 3. Any excess of condensable gases is removed through valved line 55.

The flow diagram illustrating my invention is simplified in form and it will be understood that it eliminates certain heat exchange equipment; insulation; flow, temperature, pressure and liquid level control and measurement devices; additional valves and pumps; and other details which are familiar to those skilled in the art and which would only serve to burden this specification if described and shown.

"Promoters" can be used with my catalysts, particularly homogeneous (vapor phase) "promoters" such as hydrogen bromide, alkyl bromides, iodine, alkyl iodides, ethylene oxide, etc.

Thus, for instance, a boron silicate catalyst prepared by any of the methods above described can be used in a catalytic gas reversion operation together with about 1% by weight of normal butyl bromide which can suitably be added with the gaseous charging stock.

In general, while I have described my invention with particular reference to certain specific embodiments thereof it will be understood that these are by way of illustration and not by way of limitation and I do not mean to be restricted thereby but only to the scope of the appended claims.

I claim:

1. A method of gas reversion comprising contacting a hydrocarbon charging stock boiling at least predominantly between about 200° F. and about 750° F. and a gas rich in at least one hydrocarbon having from two to four carbon atoms per molecule simultaneously under high temperature conditions with a catalyst comprising boron oxide and aluminum oxide adsorbed on active silica.

2. A method of gasoline manufacture comprising contacting simultaneously a hydrocarbon charging stock boiling at least predominantly between about 200° F. and about 750° F. and a gas rich in at least one hydrocarbon having not less than three and not more than four carbon atoms per molecule with a catalyst consisting essentially of boron and aluminum oxides adsorbed on active silica at a temperature of from about 800° F. to about 1100° F. and a pressure of from about 100 pounds per square inch to about 1000 pounds per square inch for from about 5 seconds to about 15 minutes.

3. A method of gasoline manufacture comprising contacting simultaneously a hydrocarbon charging stock boiling at least predominantly between about 200° F. and about 750° F. and a gas rich in at least one hydrocarbon having not less than three and not more than four carbon atoms per molecule with a catalyst consisting essentially of boron and aluminum oxides adsorbed on active silica at a temperature of from about 800° F. to about 1100° F. and a pressure of from about 100 pounds per square inch to about 1000 pounds per square inch for from about 5 seconds to about 15 minutes, separating the products of the foregoing operation into fractions including a gas fraction, a gasoline fraction and a cycle stock fraction, and recycling at least a substantial portion of said gas fraction to said contacting step.

4. A method of gasoline manufacture comprising contacting a hydrocarbon charging stock boiling at least predominantly between about 200° F. and about 750° F. and a gas rich in at least one hydrocarbon having not less than three and not more than four carbon atoms per molecule with each other and with a catalyst consisting essentially of boron and aluminum oxides adsorbed on active silica at a temperature of from about 800° F. to about 1100° F. and a pressure of from about 100 pounds per square inch to about 1000 pounds per square inch for from about 5 seconds to about 15 minutes, separating the products of the foregoing operation into fractions including a gas fraction, a gasoline fraction and a cycle stock fraction, and recycling at least a substantial portion of said cycle stock to said contacting step.

5. A catalytic gas reversion process comprising contacting a hydrocarbon gas having from three to four carbon atoms per molecule with a normally-liquid hydrocarbon charging stock at an elevated temperature and pressure in the presence of a catalyst consisting essentially of boron and aluminum oxides adsorbed on active silica, separating the products of this operation into fractions comprising a light gas fraction, a fraction rich in hydrocarbons having from two to four carbon atoms per molecule, a gasoline fraction and a cycle stock fraction heavier than gasoline, and recycling at least a substantial part of the fraction rich in hydrocarbons having from two to four carbon atoms per molecule and at least a substantial part of the cycle stock fraction to the contacting step.

6. A catalytic gas reversion process comprising contacting a hydrocarbon gas having from three to four carbon atoms per molecule with a normally-liquid hydrocarbon charging stock at an elevated temperature and pressure in the presence of a catalyst consisting essentially of boron and aluminum oxides adsorbed on active silica, separating the products of this operation into fractions comprising a light gas fraction, a fraction rich in hydrocarbons having from two to four carbon atoms per molecule, a gasoline fraction and a cycle stock fraction heavier than gasoline, scrubbing the light gas fraction with a portion of the cycle stock fraction, and cycling the cycle stock containing three and four carbon atom hydrocarbon components absorbed from said light gas fraction to the separation step.

7. The method of simultaneously converting heavy hydrocarbon oils and hydrocarbon gases into gasoline which comprises combining a stream of said heavy hydrocarbon oil with a stream of said hydrocarbon gas, heating said combined hydrocarbon stream to an elevated temperature between 800 and 1100° F., passing said combined hydrocarbon stream through a bed of granulated catalyst consisting essentially of boron and aluminum oxides adsorbed on active silica, whereby gas reversion of said hydrocarbons results with the formation of hydrocarbons boiling within the gasoline boiling range, subjecting said gas reverted hydrocarbons to fractionation and separating them into a heavy unconverted cycle oil fraction, a gasoline fraction and a hydrocarbon gas fraction, withdrawing said gasoline fraction and recycling said cycle oil fraction and said hydrocarbon gas fraction.

8. The process of claim 7 wherein the said hydrocarbon gas employed is essentially propane.

RODNEY V. SHANKLAND.